United States Patent
Domigan et al.

(10) Patent No.: US 6,832,447 B2
(45) Date of Patent: Dec. 21, 2004

(54) TRAP

(75) Inventors: Ian Ross Domigan, Canterbury (NZ); Bruce Warburton, Christchurch (NZ)

(73) Assignee: Landcare Research New Zealand Limited Canterbury Agriculture and Science Centre, Christchurch (NZ)

(*) Notice: Subject to any disclaimer, the term of this patent is extended or adjusted under 35 U.S.C. 154(b) by 0 days.

(21) Appl. No.: 10/238,024

(22) Filed: Sep. 9, 2002

(65) Prior Publication Data

US 2003/0115790 A1 Jun. 26, 2003

Related U.S. Application Data

(63) Continuation of application No. PCT/NZ01/00034, filed on Sep. 11, 2001.

(30) Foreign Application Priority Data

Mar. 10, 2000 (NZ) ................................................ 503346

(51) Int. Cl.$^7$ ............................................. A01M 23/26
(52) U.S. Cl. .................................. 43/94; 43/93; 43/88
(58) Field of Search ....................................... 43/88–95

(56) References Cited

U.S. PATENT DOCUMENTS

| | | | | |
|---|---|---|---|---|
| 63,961 A | * | 4/1867 | Teed | 43/94 |
| 81,023 A | * | 8/1868 | Smith | 43/88 |
| 92,823 A | * | 7/1869 | Harwood | 43/94 |
| 119,826 A | * | 10/1871 | Coppock | 43/94 |
| 150,682 A | * | 5/1874 | Gass | 43/94 |
| 350,261 A | * | 10/1886 | Matthai | 43/94 |
| 430,231 A | * | 6/1890 | Holler | 43/94 |
| 446,921 A | * | 2/1891 | Maul | 43/94 |
| 1,118,752 A | * | 11/1914 | Estrada | 43/94 |
| 1,160,623 A | * | 11/1915 | Ledyard | 43/94 |
| 1,161,891 A | * | 11/1915 | Roy | 43/94 |
| 1,479,853 A | * | 1/1924 | Gambee | 43/94 |
| 1,580,583 A | * | 4/1926 | Catlin | 43/94 |
| 1,762,783 A | * | 6/1930 | Kascak | 43/94 |
| 1,769,770 A | * | 7/1930 | Clayton | 43/94 |
| 1,871,157 A | * | 8/1932 | Clayton | 43/94 |
| 4,070,787 A | * | 1/1978 | Oakes | 43/94 |
| 4,161,842 A | * | 7/1979 | Jacob | 43/94 |
| 4,175,350 A | * | 11/1979 | Preston | 43/93 |

FOREIGN PATENT DOCUMENTS

| | | | | |
|---|---|---|---|---|
| DE | 2507 B1 | * | 2/1878 | 43/90 |
| DE | 104274 B1 | * | 4/1899 | 43/88 |
| DE | 109911 B1 | * | 4/1900 | 43/94 |
| DE | 579055 B1 | * | 6/1933 | 43/94 |
| WO | WO-01/65933 A1 | * | 9/2001 | |

* cited by examiner

Primary Examiner—Darren W. Ark
(74) Attorney, Agent, or Firm—Thomas Vigil; Welsh & Katz, Ltd.

(57) ABSTRACT

The trap (42, 82) is based around a spring mechanism (24, 60) comprising a substantially rectangular sheet of spring material folded to be substantially C-shaped in cross-section. In one embodiment (FIG. 6), portions (64, 65) of the spring mechanism (60) are adapted to be killing surfaces. In another embodiment (FIG. 2), the spring mechanism (24) is provided with arms (28, 29) that support jaws (36, 37). A setting mechanism (53/54, 77) holds the spring mechanism (24, 60) in an armed position and the trap (42, 82) is triggered when a trigger mechanism (49, 75) is moved by an animal which in turn disengages the setting mechanism (53/54, 77) and allows the killing surfaces (portions 64, 65) or jaws (36, 37) to come together on the animal therebetween.

9 Claims, 9 Drawing Sheets

TRAP

FIELD OF THE INVENTION

The invention relates to a trap and in particular to a single-kill trap for use in controlling pests such as possums.

BACKGROUND TO THE INVENTION

The trapping of animals for food, research and pest control is well known. Both live-capture and kill traps are used, depending on the aim of the trapper. Traps that are designed to be lethal are typically required to kill within a certain limited time period to avoid undue suffering to the animal caught in the trap.

In areas where a particular species is released from its usual population controls, either through a change in the local environment or introduction into a new environment, that species may breed prolifically, affecting surrounding plant and animal life. Such effects often have significant cultural and commercial repercussions resulting in focused efforts to eradicate or at least control the pest.

In New Zealand, one of the most prolific and environmentally destructive pest species is the possum, introduced from Australia in the mid 1800's to establish a fur trade. The possum population in Australia is limited by predators, bush fires and a less bountiful food supply, none of which impact on the possum in New Zealand. Other introduced (intentionally or otherwise) animals that have become pests include mustelids (ferrets, stoats and weasels), rats, cats (domestic or wild) and dogs (domestic or wild).

While existing pest control methods are successful, they invariably have their Limitations. For example, the traps currently used, such as the Timm's trap (described in NZ 207241 as outlined below) and the "Conibear" style of trap, are too bulky to carry in large numbers or need a special enclosure built to house them.

There is a need in the art for a trap that is lightweight, compact and that requires no additional housing.

PRIOR ART

New Zealand Patent Specification 238559 teaches of a possum trap having two telescoping cylinders, the lower of which has an aperture through which the possum places its head to reach bait. In reaching the bait the possum's head pushes a depending arm which releases a catch allowing the upper cylinder to drop, preferably under spring bias. This catches the possum's neck between the rim of the upper cylinder and the bottom of the aperture, throttling it.

New Zealand Patent Specification 189654 also discloses a trap consisting of two telescoping cylinders, each having a hole which are in register when the trap is set. When an animal places its head through the holes and reaches for and moves a baited trigger, a locking bar is released allowing the two cylinders to move relative to each other catching the animal around the neck and killing it.

New Zealand Patent Specification 238499 describes a possum trap with a spring loaded linearly moveable blade. When a possum enters the trap and pushes on a trigger plate the blade is released and severs the possum's neck.

New Zealand Patent Specification 207241 discloses a possum trap comprising a hollow housing with an opening providing access to a baited trigger. When the trigger is moved "over-centre" by a possum taking the bait a trigger pin pivots and releases a spring biased impact bar which is pulled rapidly upward trapping the possum's head in the opening and stopping air and blood circulation.

U.S. Pat. No. 5,010,682 teaches of an animal trap including a spring with biased apart first and second arm members extending outwards from the spring. A loop on the first arm member encircles a jaw portion on the second arm member which is biased towards a side of the loop. When a trigger is pushed, the second arm member is released catching an animal's head and throttling it between the jaw portion and the loop.

The disadvantages of the prior art traps discussed above are that they are generally too bulky and heavy to store or carry in large quantities conveniently or they require an enclosure to be built or located to house them in use.

OBJECT OF THE INVENTION

It is therefore an object of the invention to provide a light weight, compact, effective single-kill trap; and/or to overcome or address at least one of the disadvantages of the prior art; and/or at the least to provide the public with a useful choice.

SUMMARY OF THE INVENTION

According to a first aspect of the invention there is provided a single kill animal trap comprising:

a spring means comprising a substantially rectangular sheet of spring material folded transversely to be substantially C-shaped in longitudinal cross-section defining an upper surface, a lower surface and a back wall; whereby said upper surface and said lower surface are biased together, and wherein a portion of each of the upper surface and the lower surface is adapted to be a killing surface in use;

a setting means adapted to hold the upper and lower surfaces in an armed position; and a trigger means positioned within the space defined by the upper and lower surfaces and the back wall of the spring means and co-operable with said setting means;

the trap being triggered when the trigger means is moved by an animal which in turn disengages the setting means allowing the killing surfaces to come together on a said animal therebetween.

Preferably the spring material is spring steel.

Preferably the trap has side panels that block entry to the side of the trap.

Preferably the side panels are transparent.

Preferably the trap further comprises a connecting means wherein the setting means is co-operable with the trigger means through said connecting means.

In a preferred embodiment of the first aspect of the invention the setting means comprises at least two arms pivotally attached to and projecting inwardly from each of the upper surface and the lower surface, each arm from the upper surface being pivotally connected to a corresponding arm from the lower surface to define a pivot point. Preferably the arms are attached to the upper or lower surface substantially adjacent the killing surface.

Preferably the trigger means comprises a lever arm comprising a trigger portion and a tab portion wherein said lever arm flexibly engages the back wall between said trigger portion and said tab portion so that said trigger portion extends into the interior of the trap and said tab potion protrudes behind the back wall whereby said tab portion is adapted to move the connecting means in use to release the setting means. In a highly preferred embodiment the trigger means comprises two lever arms wherein the trigger portions are flexibly engaged. Preferably the trigger portions are flexibly engaged by a bait means. Preferred forms of a bait means include, but are not limited to, a material such as wood or plastic that is impregnated with an attractant appropriate to attract the desired target species.

Preferably the connecting means comprises a substantially U-shaped connecting member wherein one arm of the member engages the setting means at each pivot point, whereby when the trap is set the base of the member is positioned substantially adjacent the tab portion or portions of the trigger means.

Preferably the upper and lower surface may be provided with attachment means for attaching the trap to a surface.

According to a second aspect of the invention there is provided a single kill animal trap comprising:

a spring means comprising a substantially rectangular sheet of spring material folded transversely to be substantially C-shaped in longitudinal cross-section describing an upper surface, a lower surface and a back wall;

upper and lower pairs of arms projecting from the back wall of the spring means;

upper and lower jaws affixed to upper and lower arms respectively, said jaws biased together by the spring means;

a pivot support frame comprising an elongated rod engaging and extending upwards from each lower arm adjacent the lower jaw and a cross-piece connecting the upper ends of said rods;

a pivot rod pivotally mounted on the cross-piece, the end of the pivot rod extending away from the back wall beyond the cross-piece to form a jaw rest, the other end of said pivot rod extending above the upper surface in the direction of said back wall; and trigger means positioned within the space defined by the upper and lower surfaces and the back wall of the spring means, said trigger means engaging a connecting rod that engages a pivot rod;

the trap being armed when the upper jaw is pivoted to be engaged on the jaw rest and the other end of the pivot rod is retained by the connecting rod, trigger bar and catch; and being triggered when the trigger bar is released from the catch.

Preferably the spring material is spring steel.

Preferably the trigger means comprises a trigger bar positioned substantially parallel to said jaws and held in a set position by a catch. Preferably, said trigger bar slidably engages said connecting rod. Preferably said connecting rod projects through the upper surface of the spring means and in turn slidably engages the pivot rod.

In one preferred embodiment of the second aspect of the invention, the trap includes a secondary jaw member affixed to the upper arms between the upper jaw and the spring means. The secondary jaw is preferably a substantially W- or U-shaped member having upright arms and a mid-portion with the upright arms of the member attached to the upper arms of the trap so that when the trap is in an "unset" or "triggered" position the mid-portion of the member projects at least partially below the plane defined by the lower arms.

The frame of the second aspect of the invention is preferably removably attached to the lower arms. This enables the trap to be dismantled into a compact form for transportation and storage. A preferred means of attaching the frame comprises socket members attached to the lower arms adjacent the lower jaw and adapted to receive the lower ends of the elongated rods of the frame.

In order to deter an animal entering the trap from the side and thus to ensure a clean kill it is preferable that a trap of the second aspect of the invention has side panels attached to the elongated rods of the pivot support frame that block entry to the side of the trap. Preferably the side panels are transparent so as to give the trap an "open" feel.

Preferably a trap of the present invention is baited by placing bait in the trap in such a position that an animal entering the trap will trigger the trap by reaching for the bait. One preferred form of bait comprises plastic impregnated with cinnamon and then suitably placed in the trap. An alternative bait is peanut butter, either fresh or impregnated in plastic.

Preferably a trap of the present invention is a colour attractive, or at least not repulsive, to the target animal.

It is preferable to provide a trap of the present invention with a locking means to keep the jaws closed after the trap is triggered. This aims to prevent the animal that triggered the trap from escaping.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples.

DETAILED DESCRIPTION OF THE INVENTION

As used herein, the terms "set" and "armed" refer to where a trap of the present invention is in a state that is able to be triggered by a target animal.

As used herein, the terms "unset" and "unarmed" refer to where a trap of the present invention is in a state that is not able to be triggered by a target animal.

Figure 1A:
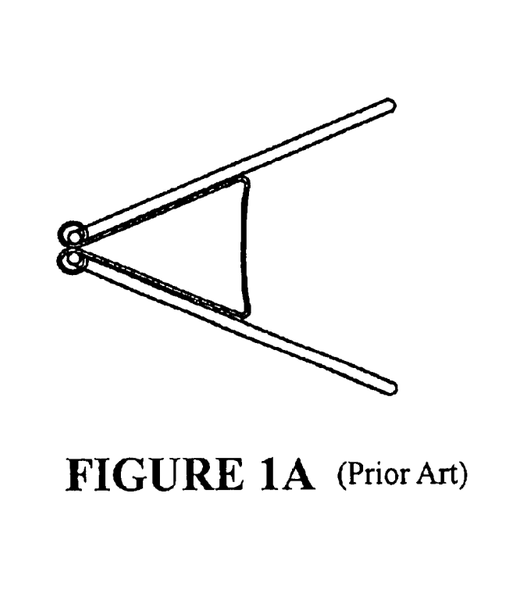
FIG. 1A is a prior art paper gripper sold under the name "Bulldog" clip.

FIG. 1A shows a "Bulldog" clip of the prior art. Such a clip uses the bias created by spring steel to clamp the jaws together to grip a stack of sheets of paper. The spring steel sheet functions in a substantially similar manner to the spring means of the first and second aspects of the present invention.

Figure 1B:
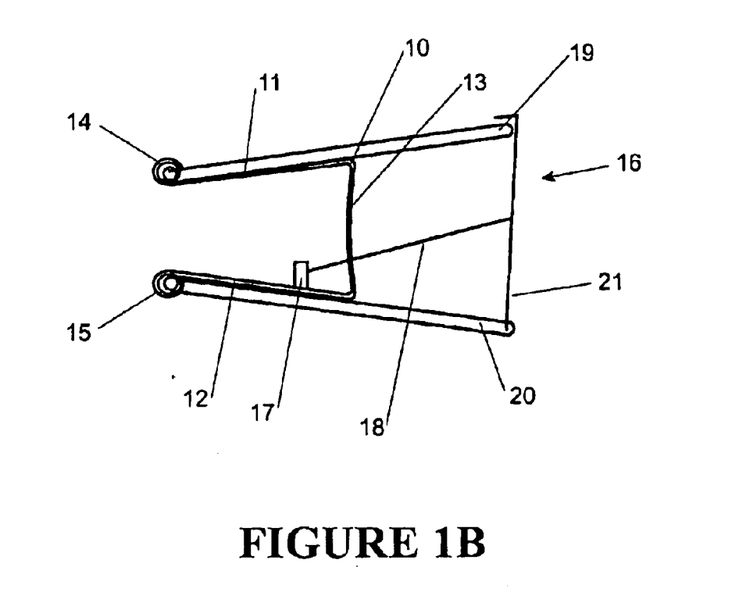
FIG. 1B is an elevational view from the side of a trap of a first aspect of the present invention.

A first rudimentary embodiment of the invention is shown in FIG. 1B. A spring means 10 has upper and lower surfaces 11 and 12 and a back wall 13. The spring means is preferably cold formed from a sheet of steel and then heated to induce its spring ability. The advantages of this method of producing the spring means are that there is little stress concentration and the spring means also provides a central body about which the rest of the trap is constructed, without the need for 'a separate body component. This means the trap is less heavy and bulky than existing traps of a similar style.

The spring means is provided with kill surfaces 14 and 15 that are biased together. Setting means 16 enables the trap to be "set" so that, in combination with a trigger means 17, the killing surfaces are held apart under tension. Connecting means 18 connects the trigger means 17 to the setting means 16. When an animal enters the trap and moves the trigger means 17, this in turn moves the connecting means 18 and the setting means 16 releasing the spring means and allowing the killing surfaces 14 and 15 to come together on the animal.

The setting means 16 is preferably comprised of a pair of opening lever arms 19 and 20 and a setting arm 21.

It will be appreciated that various forms of trigger means and setting means are contemplated within the scope of the invention. For example, the trigger means can comprise a trigger bar and catch arrangement substantially as described below in respect of a second aspect of the invention. The setting means can comprise two arms that engage the spring means and that are adapted to lever the killing surfaces apart, in combination with a setting arm that pivots about an end of one arm and engages an end of the other arm as shown in FIG. 1B. The connecting means may pass through or around either the upper or lower surface or the back wall of the spring means.

In order to prevent an animal entering the trap from the side and thus to ensure a clean kill, the trap can be fitted with side panels, substantially as described below.

Preferably the trap is baited by placing bait in the trap in such a position that the animal entering the trap will trigger the trap by reaching for the bait. One preferred form of bait comprises plastic impregnated with cinnamon and suitably placed in the trap. An alternative preferred bait is peanut butter, either fresh or impregnated in plastic.

Figure 2:
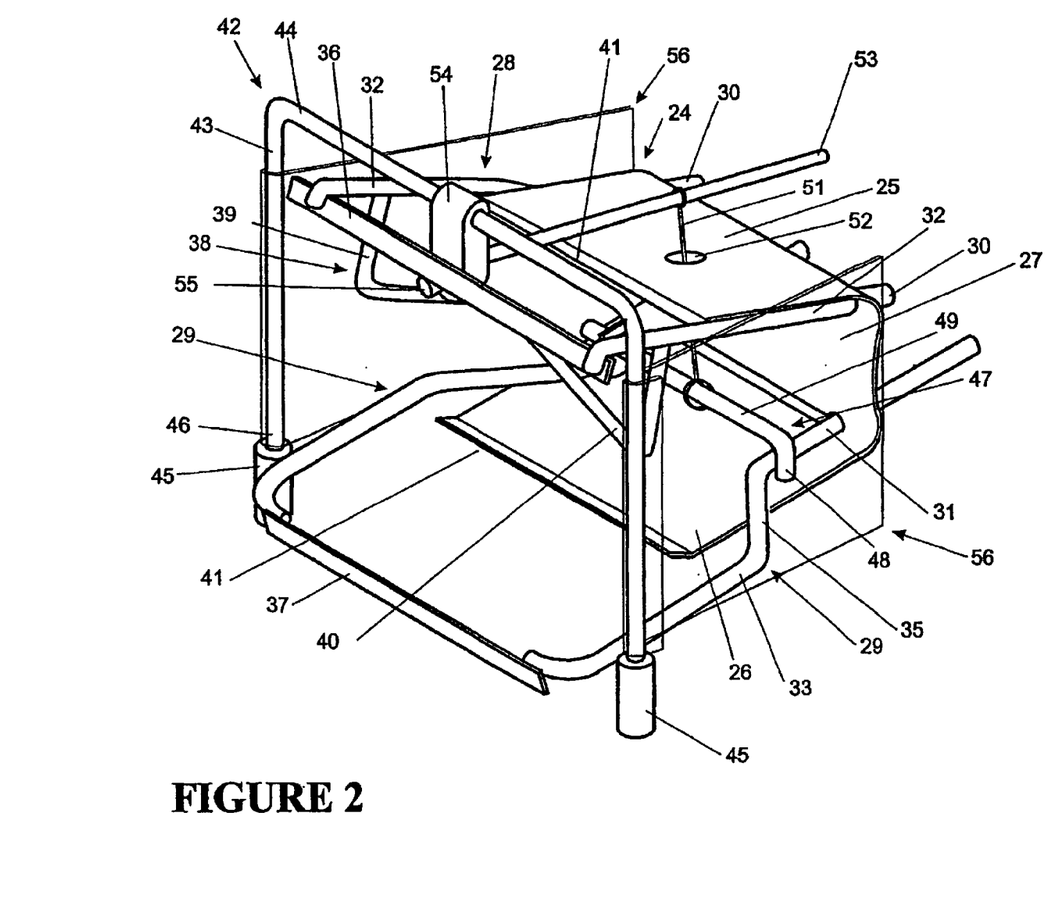
FIG. 2 is a perspective view of a trap a second aspect of the present invention with side screens.

Referring to FIG. 2, a trap of another embodiment of the invention is constructed about a spring 24 that has upper and lower surfaces 25 and 26 and a back wall 27. The spring is preferably formed in the same manner as that shown in FIG. 1B.

As shown in FIGS. 2 to 5, an upper pair of arms 28 and a lower pair of arms 29 project from the spring means. In a preferred form, holes are drilled in the back wall 27 of the spring and one end of each arm passes through each hole. Preferably the arms comprise an inner section (30, 31) and an outer section (32, 33) joined by a middle portion (34, 35). The outer section is offset from the inner section by the middle portion as shown.

Jaws 36 and 37 are attached to the outer ends of the upper and lower arms 28 and 29 respectively, as shown. The jaws are biased together by the spring means and when the trap is in the "unset" or "unarmed" position the jaws lie substantially directly against each other. The jaws are the primary kill point of the trap. A W- or U-shaped secondary jaw member 38 having upright arms 39 and a mid-portion 40 is a preferable addition to the trap and is positioned depending from the upper arms 28 so that when the trap is in the "unset" or "unarmed" position, the mid-portion is at least partially lower than the plane defined by the lower pair of arms 29. This secondary jaw assists in holding an animal in the trap until it expires. A secondary kill point is provided by the edges 41 of the spring means itself In an alternate embodiment, the secondary jaw member 38 may be mounted between the lower arms 29.

The trap is also provided with a pivot rod support frame 42. Two elongated rods 43 extend upwards from each lower arm substantially adjacent the lower jaw. A crosspiece 44 runs between the apex of each rod. In a highly preferred form of the invention the frame 42 is removably attached to the lower arms. This allows the trap to be dismantled into a more compact form to facilitate storage and transportation. A preferred means of attaching the pivot rod support frame 42 comprises two socket members 45 fixed to the lower arms 29 substantially adjacent the lower jaw 37 that are adapted to receive the lower ends 46 of the rods 43. It will be appreciated that other suitable forms of attaching the pivot rod support frame are included within the scope of the invention.

Figure 3:
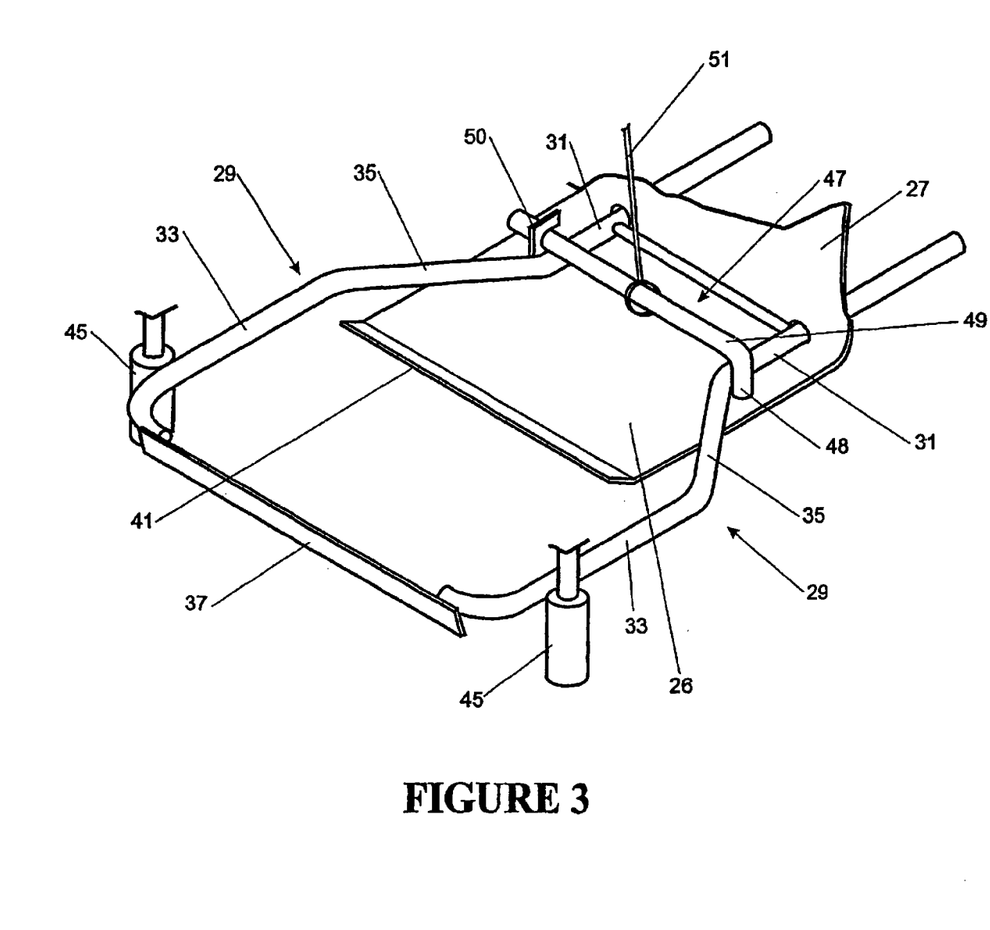
FIG. 3 is a cutaway perspective view of the trigger means of a trap of FIG. 2.

A trigger bar 47 preferably comprises an L-shaped bar with the short arm 48 of the bar pivotally fixed to the lower surface of the spring adjacent an outer edge of the lower surface. The long arm 49 of the bar then projects across the lower surface of the spring and is held in the "set" position by a catch 50, as shown in FIG. 3. The catch is preferably arranged so that to disengage the trigger bar from the catch and thus trigger the trap, the bar must be pushed towards the back wall 27. It will be appreciated that other methods of releasing the trigger bar from a catch, as known in the art, are included within the scope of the invention. A connecting rod 51 is slidably connected to the trigger bar and projects from trigger bar up through a hole 52 in the upper surface 25 of the spring. The connecting rod then slidably engages a pivot rod 53 which in turn engages a pivot block 54 which is mounted on the crosspiece 44 of the pivot support frame. The pivot rod protrudes slightly from the front of the pivot block to form a jaw rest 55, as shown in FIG. 2.

Figure 4:
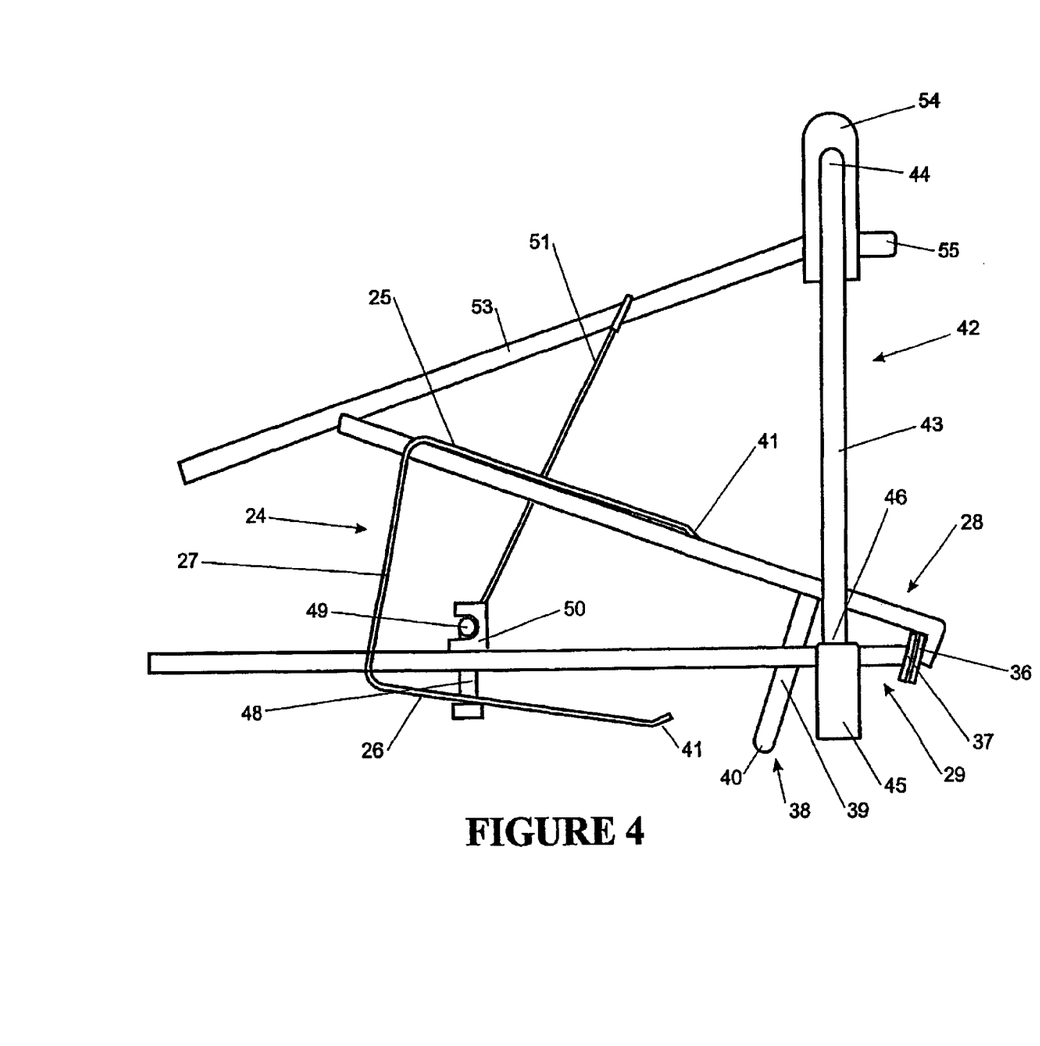
FIG. 4 is an elevational view from the side of the trap of FIG. 2 without the side screens.
Figure 5:
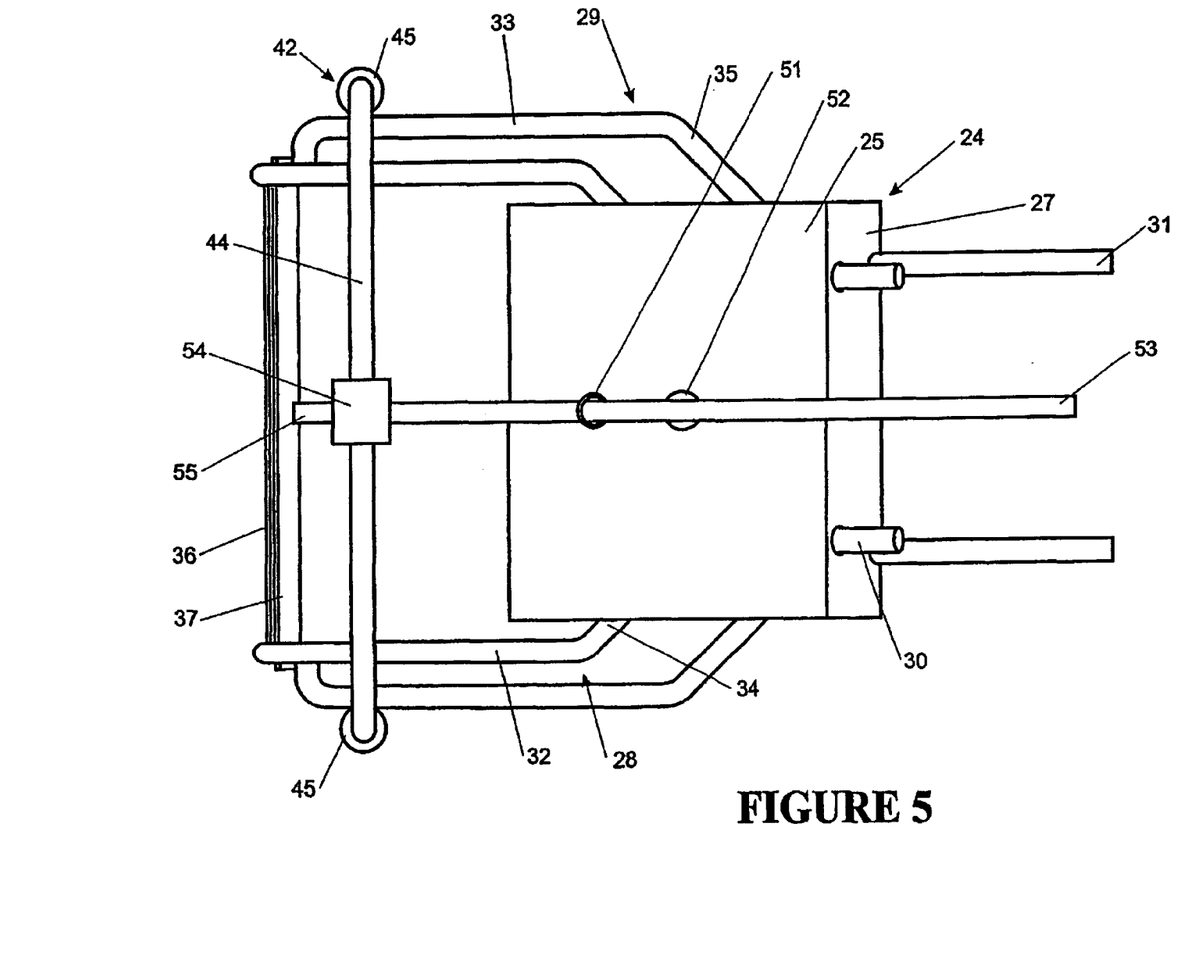
FIG. 5 is a plan view from above of the trap of FIG. 2 without the side screens.

When the trap is "set" the upper jaw is lifted to rest on the jaw rest and the trigger bar is engaged by the catch, as shown in FIG. 2. This arrangement opens the spring and places tension on the trigger bar making it sensitive to being moved in a direction permitted by the catch. While the trigger bar is engaged by the catch the pivot rod is prevented from pivoting and releasing the upper jaw by the connecting rod. When an animal entering the trap moves the trigger bar sufficiently to disengage the trigger bar from the catch, the connecting rod and thus the pivot rod are free to move. Once there is no restraint on the pivot rod, the downward force exerted on the jaw rest by the upper jaw forces the pivot bar to pivot about the cross piece until the jaw rest is no longer able to hold the upper jaw. The upper jaw then moves forcibly downward to meet the lower jaw, as shown in FIG. 4.

In order to prevent an animal entering the trap from the side and thus to ensure a clean kill, the trap can optionally be fitted with side panels 56 that attach to the elongated rods of the pivot support frame, as shown in FIG. 1. The panels project along the side of the trap to at least cover the area from the pivot support frame to the back wall of the spring. The side panels are preferably transparent so as to give the trap an "open" feel. It will be appreciated that various means of attaching the side panels are included within the scope of the invention.

In a preferred embodiment of the invention a locking means is provided to keep the jaws closed after the trap is triggered. This aims to prevent larger animals that trigger the trap from escaping once the jaws have closed. One possible form of locking means comprises providing the connecting rod with a washer that acts as a "cam-lock". In other words, when the trap is triggered the washer settles onto the upper surface of the spring and, being on an angle, locks against the connecting rod and prevents the upper surface of the spring from moving. It will be appreciated that other equivalent locking means that prevent the spring means from opening are contemplated within the scope of the present invention.

Preferably the trap is baited by placing bait in the trap in such a position that the animal entering the trap will trigger the trap by reaching for the bait. Preferable locations for the bait include, but are not limited to, the trigger bar 47, the connecting rod 51, lower surface 26 or back wall 27. One preferred form of bait comprises plastic impregnated with cinnamon and suitably placed in the trap. An alternative preferred bait is peanut butter, either fresh or impregnated in plastic.

Figure 6:
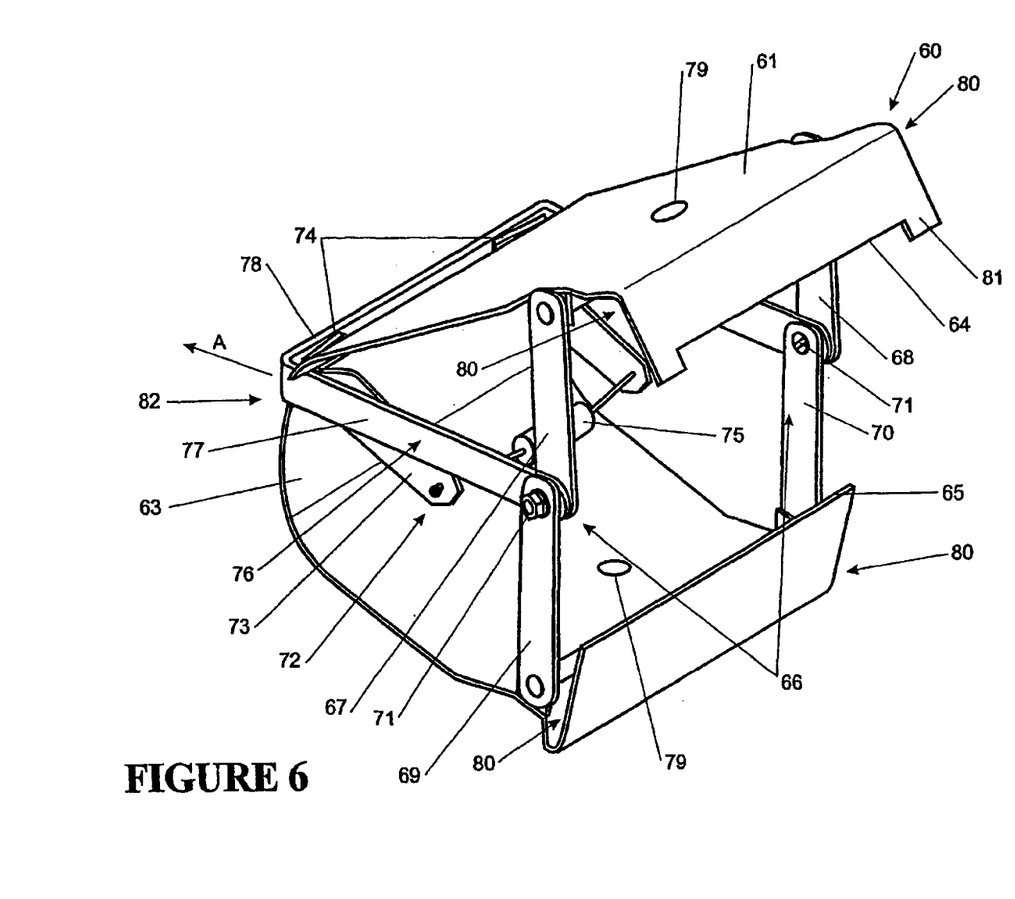
FIG. 6 is a front perspective view of a trap of a preferred embodiment of the first aspect of the present invention in an armed position.
Figure 7:
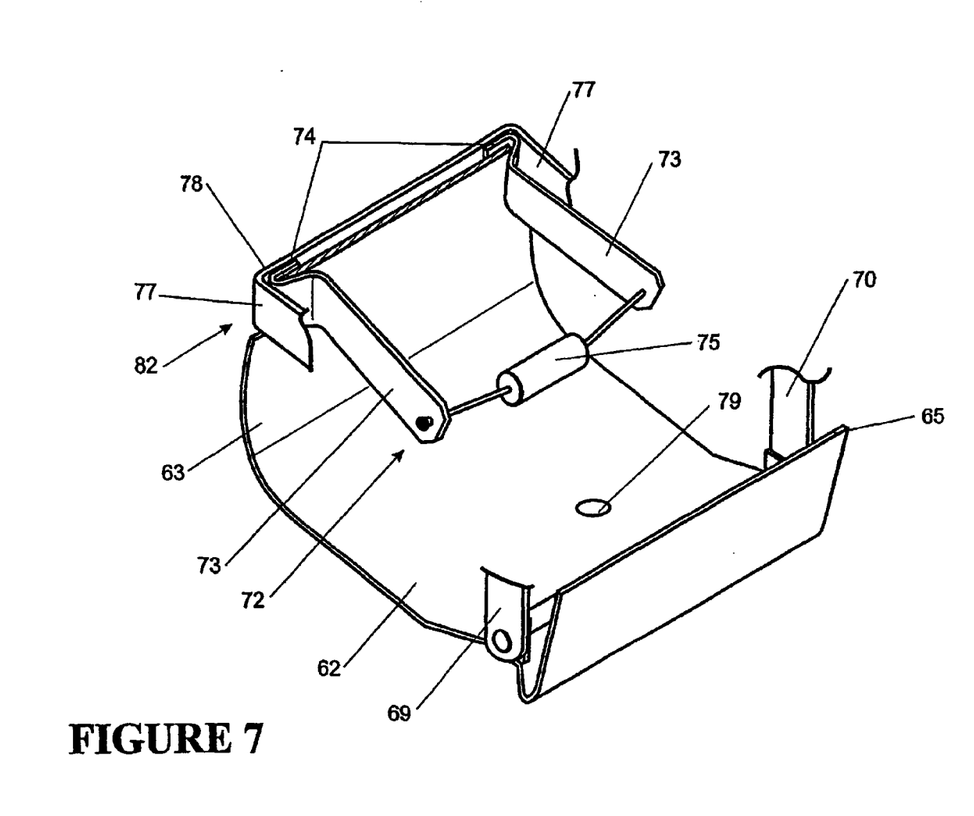
FIG. 7 is a front perspective cut-away view of the interior of the trap of FIG. 6.
Figure 8:
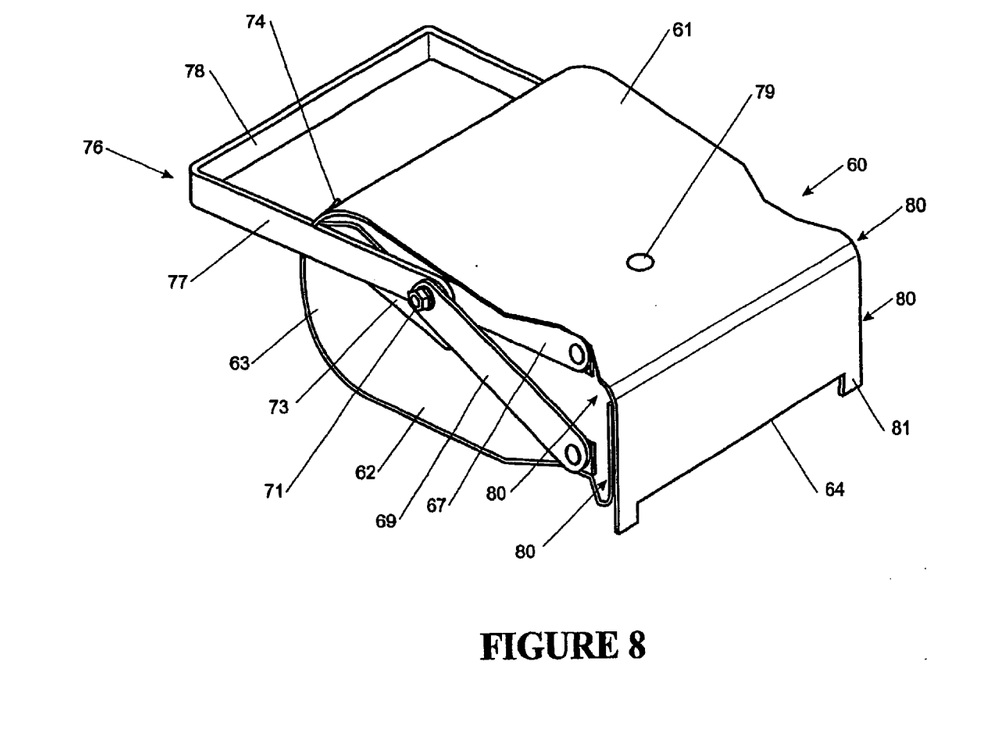
FIG. 8 is a perspective view of the trap of FIG. 6 in an unarmed position.
Figure 9:
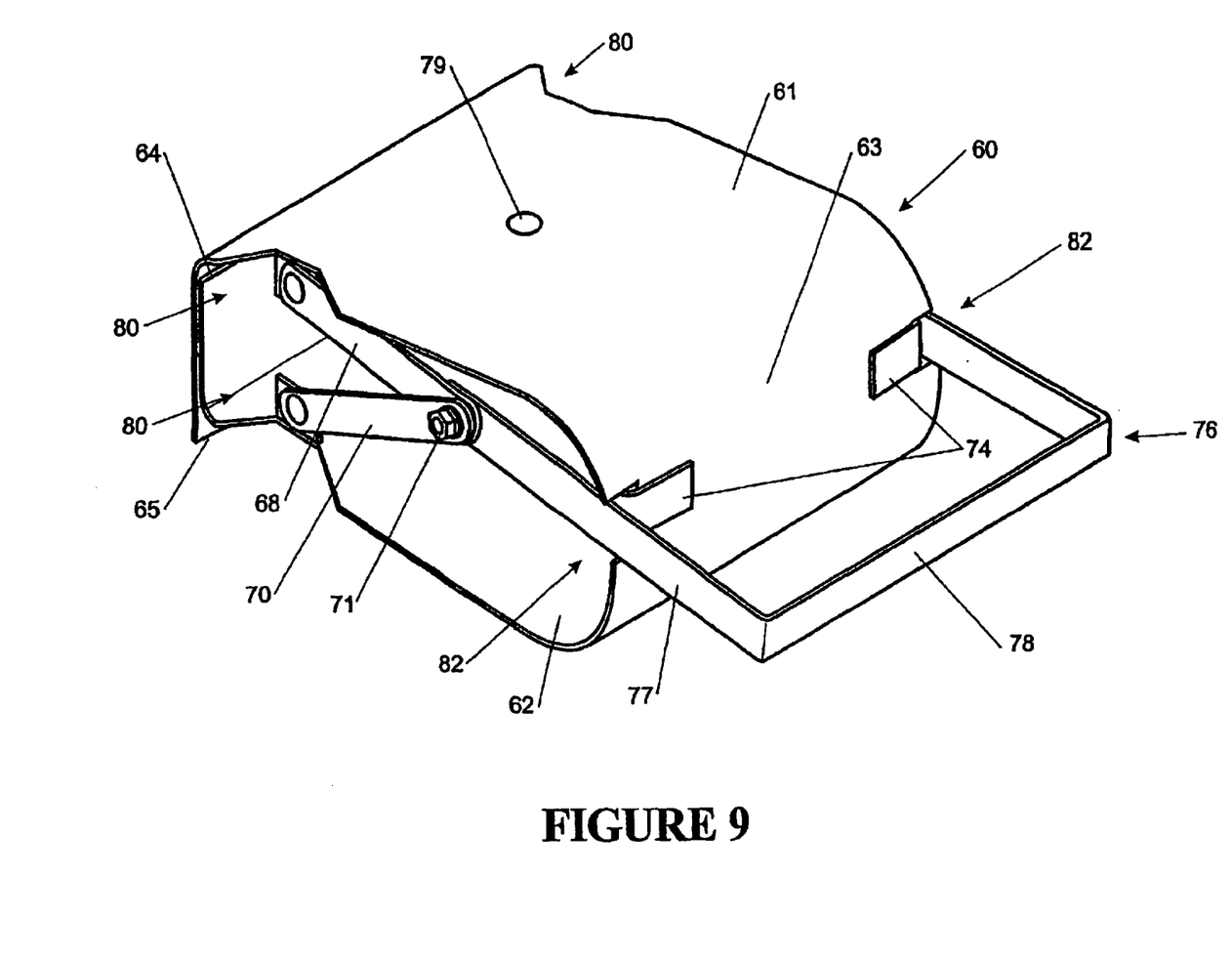
FIG. 9 is an alternate perspective view of the trap of FIG. 6 in an unarmed position.

Another embodiment of the invention is shown in FIGS. 6 to 9. FIG. 6 shows the trap in an "armed" or "set" position and FIGS. 8 and 9 show the trap in a "unarmed" or "unset" position.

A spring means 60 has upper and lower surfaces 61 and 62 and a back wall 63. The spring means is provided with kill surfaces 64 and 65 that are biased together. Setting means 66 enables the trap to be "set". The setting means comprises at least two setting arms pivotally attached to and projecting inwardly from each of the upper surface 61 (arms 67 and 68) and the lower surface 62 (arms 69 and 70), each arm from the upper surface being pivotally connected to a corresponding arm from the lower surface at a common pivot point 71. Preferably the setting arms 67, 68, 69 and 70 are attached to the upper and lowers surfaces substantially adjacent the killing surfaces 64 and 65. Preferably pivot point 71 is at a point equidistant from each surface.

The trigger means comprises one or more lever arms 72 comprising a trigger portion 73 and a tab portion 74 wherein said lever arm flexibly engages the back wall 63 between said trigger portion 73 and said tab portion 74 so that said trigger portion 73 extends into the interior of the trap and said tab potion 74 protrudes behind the back wall 63 whereby in use the tab portion is immediately adjacent or touching the connecting means. In a highly preferred embodiment the trigger means comprises two lever arms wherein the trigger portions 73 are flexibly engaged. Preferably the trigger portions are flexibly engaged by a bait means 75. Preferred forms of a bait means include, but are not limited to, a material such as wood or plastic that is impregnated with an attractant appropriate to attract the desired target species.

It will be appreciated by those skilled in the art that alternate embodiments of the present invention include alternative triggering means that are adapted to be triggered in use by a target animal and move said connecting means.

The connecting means 76 comprises a substantially U-shaped connecting member wherein one arm 77 of the member engages the setting means 66 at each pivot point 71. When the trap is set, the base 78 of the member is positioned substantially adjacent the tab portion or portions 74 of the trigger means as shown in FIGS. 6 and 7. When the trap is unset or has been triggered the base 78 is situated away from the tab portions and the back wall 63 as shown in FIGS. 8 and 9.

Preferably the upper and lower surface may be provided with attachment means 79 for attaching the trap to a surface. Preferably the attachment means allows the trap to be attached to a surface that is not horizontal and more preferably to a substantially vertical surface. The attachment means may comprise a hole allowing the trap to be hung on a nail for example or it may comprise a clip or hook allowing the trap to be fixed to any suitable deformation on the surface.

This embodiment of the present invention does not require side screens as the setting means 66 and connecting means 76 prevent access from the side to the interior of the trap.

The trap is set by moving the killing surfaces 64 and 65 apart. Preparation for setting the trap comprises inserting a first member such as a metal bar through the interior of the trap so that it rests directly on the lower surface 62 and projects from each side of the trap and inserting a second member such as a piece of rope or another metal bar through the interior of the trap positioned to that it may bear against the upper surface 61 and projects from each side of the trap. Preferably the members are inserted between the point of connection of the setting arms to the upper and lower surfaces and the killing surface such as at the position indicated by the number 80 in the figures. The trap may then be moved into a set position by applying opposing forces to each object to move the killing surfaces apart. As the killing surfaces are moved apart the setting arms line up relative to each other drawing the pivot point away from the back wall 63. This in turn draws the connecting member 76 forward so that when the trap is set the base 78 comes to rest substantially against the tab portions 74 of the trigger means. Once the setting arms 67, 68, 69 and 70 are lined up relative to each other they are able to hold the killing surfaces 64 and 65 apart against the tension in the spring means 60.

In an alternative embodiment leverage means may be permanently attached at the positions indicated by the number 80.

A trap of a preferred embodiment of the present invention depicted in FIGS. 6 to 9 is triggered when a target animal moves the bait means 75 sufficiently to cause the trigger portions 73 of the lever arms 72 to move inwards towards each other as they move relative to the back wall 63. This in turn causes the ends of the tab portions 74 to move away from the back wall 63 and push the base 78 of the connecting means away from the back wall in the direction of arrow "A" in FIG. 7. This in turn moves the setting arms 67, 68, 69 and 70 out of alignment with each other and the tension in the spring means 60 causes the killing surfaces 64 and 65 to come together on the animal. The trap of this embodiment is shown in the unset or unarmed (before being set or after being triggered) position in FIGS. 8 and 9.

Preferably the side edge of the back wall 63 is provided at least one recess 82. The lever arms 72 preferably engage the back wall at the recess and as shown in the figures, the arms 77 of connecting means 76 also slidably engage the back wall at these recesses. FIG. 7 shows the arrangement of these components in the recesses in a highly preferred embodiment of the trap. The recess serves as a guide for the connecting means which in turn holds the lever arms in place.

In a preferred embodiment the killing surfaces 64 and 65 may be provided with protrusions 81. These aim to prevent the head of the target animal from slipping out from between the killing surfaces when the trap is triggered.

In an alternative embodiment the killing surfaces may be sharpened so as to fully or partially sever the head of the target animal.

The sensitivity of the trap can be controlled by the arrangement of the tab portions 74 and the base 78 of the connecting means. If the two are in very close proximity when the trap is set the trap is more sensitive to triggering than if they are slightly apart. Also, the longer or thicker the tab portions 74 are, the more sensitive the trap will be as this reduces the degree of movement of the lever arms 72 needed to push the base 78 away from the back wall 63.

A trap of the present invention kills primarily by strangulation. Alternatively, it may kill by full or partial decapitation or a combination of partial decapitation and strangulation.

The above describes some preferred embodiments of the present invention and indicates several possible modifications but it will be appreciated by those skilled in the art that other modifications can be made without departing from the scope of the invention.

What we claim is:

1. A single kill animal trap comprising:

a spring means comprising a substantially rectangular sheet of spring material folded transversely to be substantially C-shaped in longitudinal cross-section defining an upper surface, a lower surface and a back wall; whereby said upper surface and said lower surface are biased together; and further wherein a portion of each of the upper surface and the lower surface is adapted to be a killing surface in use;

a setting means comprising at least two arms pivotally attached to and projecting inwardly from each of the upper surface and the lower surface, each arm from the upper surface being pivotally connected at a pivot point to a corresponding arm from the lower surface, and the setting means being adapted to hold the upper and lower surfaces in an armed position; and a trigger means positioned within a space defined by the upper and lower surfaces and the back wall of the spring means; and a connecting means pivotally attached to said setting means and releasably co-operable in use with said trigger means;

the trap being triggered when the trigger means is moved by an animal which in turn disengages the setting means allowing the killing surfaces to come together on said animal therebetween.

2. A trap of claim 1 wherein the arms are attached to the upper or lower surface substantially adjacent the killing surface.

3. A trap of claim 1 wherein the trigger means comprises a lever arm comprising a trigger portion and a tab portion wherein said lever arm flexibly engages the back wall between said trigger portion and said tab portion so that said trigger portion extends into the interior of the trap and said tab potion protrudes behind the back wall whereby said tab portion is adapted to move the connecting means in use to release the setting means.

4. A trap of claim 3 wherein the trigger means comprises two lever arms.

5. A trap of claim 3 wherein the connecting means comprises a substantially U-shaped connecting member having a base and two arms wherein each arm of the member engages the setting means at each pivot point, whereby when the trap is set the base of the member is positioned substantially adjacent the tab portion or portions of the trigger means.

6. A trap of claim 1 wherein the upper or lower surface is provided with attachment means for attaching the trap to a surface.

7. A trap of claim 1 wherein the trap is baited by placing bait in the trap in such a position that an animal entering the trap will trigger the trap by reaching for the bait.

8. A trap of claim 1 wherein the spring means comprises spring steel.

9. A trap of claim 1 wherein the trap is a colour attractive, or at least not repulsive, to a target animal.

* * * * *